(12) United States Patent
Chester et al.

(10) Patent No.: US 12,519,778 B2
(45) Date of Patent: Jan. 6, 2026

(54) SECURING A DIGITAL PASS TO A DEVICE-ASSOCIATED USER ACCOUNT

(71) Applicant: Apple Inc., Cupertino, CA (US)

(72) Inventors: Benjamin D. Chester, San Jose, CA (US); Alexey Bulgakov, Hampshire (GB); Glen W. Steele, Sunnyvale, CA (US); Russell Fenenga, Carlsbad, CA (US)

(73) Assignee: Apple Inc., Cupertino, CA (US)

( * ) Notice: Subject to any disclaimer, the term of this patent is extended or adjusted under 35 U.S.C. 154(b) by 264 days.

(21) Appl. No.: 18/371,437

(22) Filed: Sep. 21, 2023

(65) Prior Publication Data

US 2024/0364680 A1    Oct. 31, 2024

Related U.S. Application Data

(60) Provisional application No. 63/461,846, filed on Apr. 25, 2023.

(51) Int. Cl.
*H04L 9/40* (2022.01)

(52) U.S. Cl.
CPC .......... *H04L 63/083* (2013.01); *H04L 63/06* (2013.01)

(58) Field of Classification Search
CPC ... H04L 63/06; H04L 63/083; H04L 63/0807; H04L 2463/081; H04L 9/006; H04L 9/0825; H04L 9/0866; H04L 9/3213; H04L 9/3247; G06F 21/1014
See application file for complete search history.

(56) References Cited

U.S. PATENT DOCUMENTS

| | | | | |
|---|---|---|---|---|
| 7,392,226 B1* | 6/2008 | Sasaki | ................. | G07F 17/0014 705/64 |
| 2013/0032635 A1* | 2/2013 | Grinvald | .............. | G06Q 20/227 235/384 |
| 2015/0026477 A1* | 1/2015 | Malatack | ............... | H04L 63/123 713/176 |
| 2015/0213443 A1* | 7/2015 | Geffon | ............... | G06Q 20/3821 705/76 |
| 2018/0082288 A1* | 3/2018 | Chester | .............. | G06Q 20/3821 |
| 2019/0073687 A1* | 3/2019 | Chidella | ............. | G06Q 30/0215 |
| 2020/0349520 A1* | 11/2020 | Mughal | ............. | H04L 63/0823 |
| 2021/0374750 A1* | 12/2021 | Miller | ................ | G06Q 20/4014 |
| 2021/0377056 A1* | 12/2021 | Grainger | ............. | H04L 63/0853 |
| 2022/0147976 A1* | 5/2022 | Belleville | .......... | G06Q 20/3672 |
| 2023/0336347 A1* | 10/2023 | Masters | ................ | H04L 9/3239 |
| 2023/0419337 A1* | 12/2023 | Lombardi | .......... | G06Q 30/0261 |

\* cited by examiner

*Primary Examiner* — Eric W Shepperd
(74) *Attorney, Agent, or Firm* — BAKERHOSTETLER

(57) ABSTRACT

The subject system may be implemented by a processor circuit configured to transmit a request for a digital pass to a pass issuer server, receive issuer information associated with the pass issuer server, obtain a first key associated with the issuer information, and generate security data based at least in part on the first key, transmit, to the pass issuer server, the security data. The processor circuit may also be configured to receive the digital pass from the pass issuer server. The digital pass includes the security data.

20 Claims, 7 Drawing Sheets

SECURING A DIGITAL PASS TO A DEVICE-ASSOCIATED USER ACCOUNT

CROSS-REFERENCE TO RELATED APPLICATIONS

The present application claims the benefit of U.S. Provisional Patent Application Ser. No. 63/461,846, entitled "SECURING A DIGITAL PASS TO A DEVICE-ASSOCIATED USER ACCOUNT," filed Apr. 25, 2023, which is hereby incorporated herein by reference in its entirety and made part of the present U.S. Utility Patent Application for all purposes.

TECHNICAL FIELD

The present description generally relates to digital passes on electronic devices and, more particularly, to securing digital passes to a device-associated user account.

BACKGROUND

A digital pass is an electronic version of a traditional pass, often used for identification, access, or entitlement purposes. It may be stored on a smartphone, computer, or other digital device and used in place of physical passes, such as ID cards, tickets, or membership cards. The type of information and/or access provided by a digital pass may include simple identification and authentication to more complex entitlements and privileges, such as access to buildings, events, or services. Information corresponding to a digital pass may be represented by an identifier, which may, for example, be presented via an image, sound, code, signal, and the like.

BRIEF DESCRIPTION OF THE DRAWINGS

Certain features of the subject technology are set forth in the appended claims. However, for the purpose of explanation, several implementations of the subject technology are set forth in the following figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

Digital passes can be used for a variety of applications, including employee or student IDs, event tickets, gym memberships, and the like. They offer a convenient and secure way to store and manage information and access privileges, and can be updated and/or managed in real time. However, digital passes can potentially be stolen by and/or shared with unauthorized users. This can happen if the pass is copied, duplicated, or otherwise transferred from one device to another without proper authentication and authorization. Additionally, some digital passes may be susceptible to hacking or other forms of digital fraud, which can result in a pass being used by unauthorized users.

To prevent such improper transferring or sharing with unauthorized users, aspects of the subject technology provide a mechanism that binds a digital pass to a device via one or more keys that may be synchronized to a user's account so that the digital pass cannot be used on another user's device but may be used on other devices associated with the user's account. A digital pass may include a signed payload that is validated when the user's digital wallet receives the digital pass. The signed payload may be validated, for example, using a public key that resides on the user's device along with its private key, which can be synchronized with the user's other devices. Although the subject technology is primarily described herein with regard to digital passes, the subject technology may also be applicable to other digital credentials.

Figure 1:
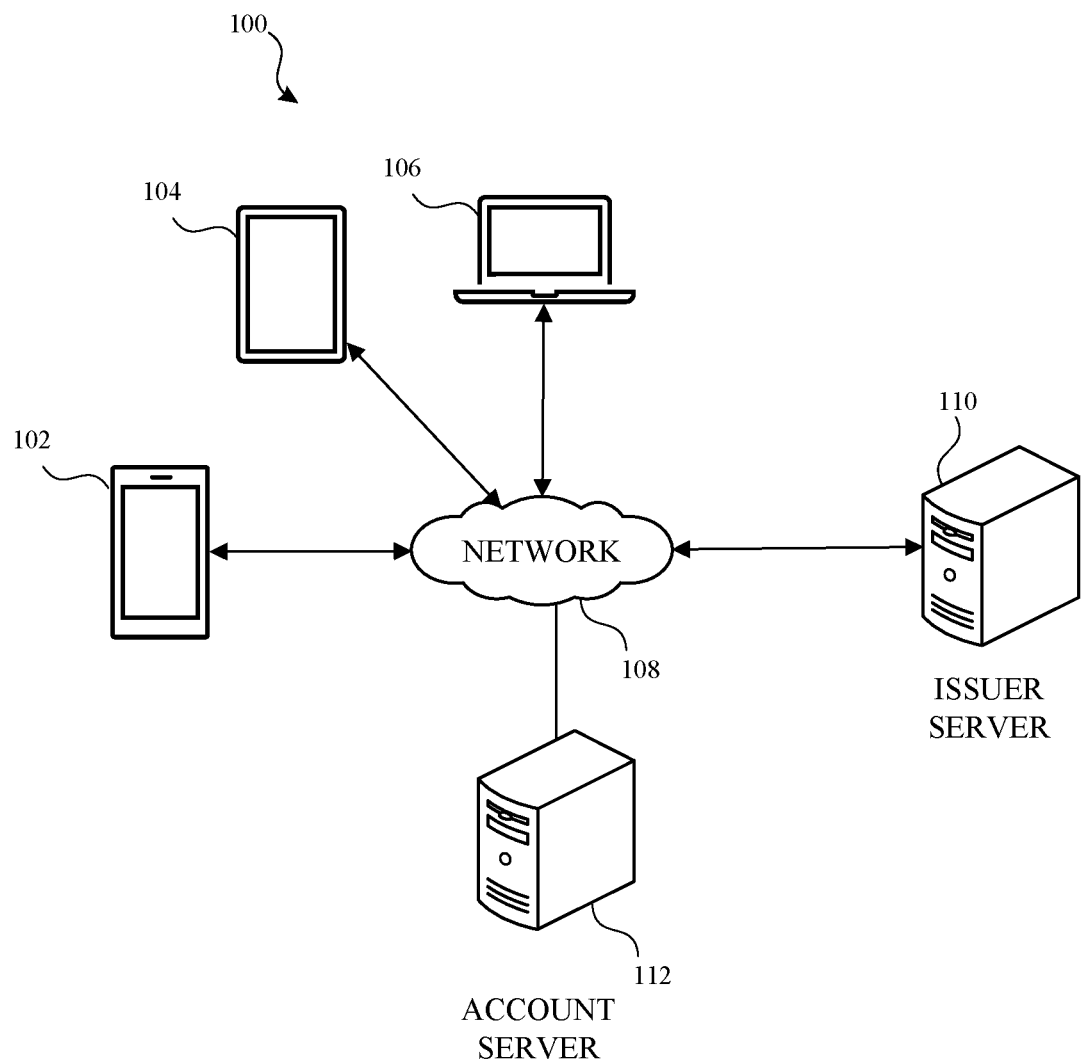
FIG. 1 illustrates an example network environment for issuing a digital pass, in accordance with one or more implementations.

FIG. 1 illustrates an example network environment 100 for issuing a digital pass, in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 100 may include an electronic device 102, one or more other electronic devices (e.g., electronic device 104 and electronic device 106), and one or more servers (e.g., issuer server 110 and account server 112). The network 108 may communicatively (directly or indirectly) couple the electronic device 102, electronic device 104, electronic device 106, the issuer server 110, and/or the account server 112. In one or more implementations, the network 108 may be an interconnected network of devices that may include, or may be communicatively coupled to, the Internet. For explanatory purposes, the network environment 100 is illustrated in FIG. 1 as including the electronic device 102, electronic device 104, electronic device 106, the issuer server 110, and the account server 112; however, the network environment 100 may include any number of electronic devices and/or any number of servers communicatively coupled to each other directly or via the network 108. Aspects of the subject technology may allow communication of digital passes and security data. With security data, a digital pass associated with an electronic device (e.g., electronic device 102) may be synchronized across other electronic devices (e.g., electronic device 104 and electronic device 106) associated with the same user account as the electronic device, as is discussed further below.

The electronic device 102 may be, for example, a wearable device such as a watch, a band, and the like, a desktop computer, a portable computing device such as a laptop computer, a smartphone, a peripheral device (e.g., a digital camera, headphones), a tablet device, or any other appropriate device that includes, for example, one or more wireless interfaces, such as wireless local area network (WLAN) radios, cellular radios, Bluetooth radios, Zigbee radios, near field communication (NFC) radios, and/or other wireless radios. In FIG. 1, by way of example, the electronic device 102 is depicted as a smartphone. The electronic device 102 may be, and/or may include all or part of, the electronic system discussed below with respect to FIG. 7 and may be associated with a user account. For example, the electronic device 102 may be registered to a user account with a service provider.

The electronic device 104 and the electronic device 106 may each be a similar electronic device as described with respect to the electronic device 102. In FIG. 1, by way of example, the electronic device 104 is depicted as a tablet and electronic device 106 is depicted as a laptop. The electronic device 104 and the electronic device 106 may be, and/or may include all or part of, the electronic system discussed below with respect to FIG. 7. The electronic device 104 and the electronic device 106 may be associated with the same user account as the electronic device 102.

In one or more implementations, the electronic device 102, the electronic device 104, and/or the electronic device 106 may be configured to generate keypairs (e.g., public and/or private keys) on a device associated with a user account. In one or more implementations, the electronic device 102, the electronic device 104, and/or the electronic device 106 may be configured to synchronize one or more keypairs (or portions and/or representations thereof) between each other and/or other devices associated with the same user account.

The issuer server 110 may issue digital passes to electronic devices (e.g., the electronic device 102, the electronic device 104, and/or the electronic device 106). Digital passes may include one or more identifiers in the form of an image, a code, a signal (e.g., an NFC signal), and the like. In some variations, the issuer server 110 includes one or more app-specific modules (e.g., plugins) that perform operations for a respective application (e.g., issuing and/or accessing digital passes). In one or more implementations, a digital pass may be provisioned and stored in memory to be managed/accessed by a host or application processor of one or more of the electronic devices 102, 104, and/or 106.

The account server 112 may store account information (e.g., user account, usernames/handles, or any other account-specific data) associated with the electronic device 102, the electronic device 104, the electronic device 106, and/or users thereof and/or users associated therewith. In one or more implementations, one or more servers (e.g., the issuer server 110) may provide content (e.g., digital passes) that is to be processed (e.g., validated) at a device (e.g., the electronic device 102, the electronic device 104, and/or the electronic device 106) by an application or operating system of the device. In one or more implementations, the electronic device 102 may be communicatively coupled to the account server 112 to provide digital passes and/or keys to the electronic device 104 and/or the electronic device 106.

Figure 2:
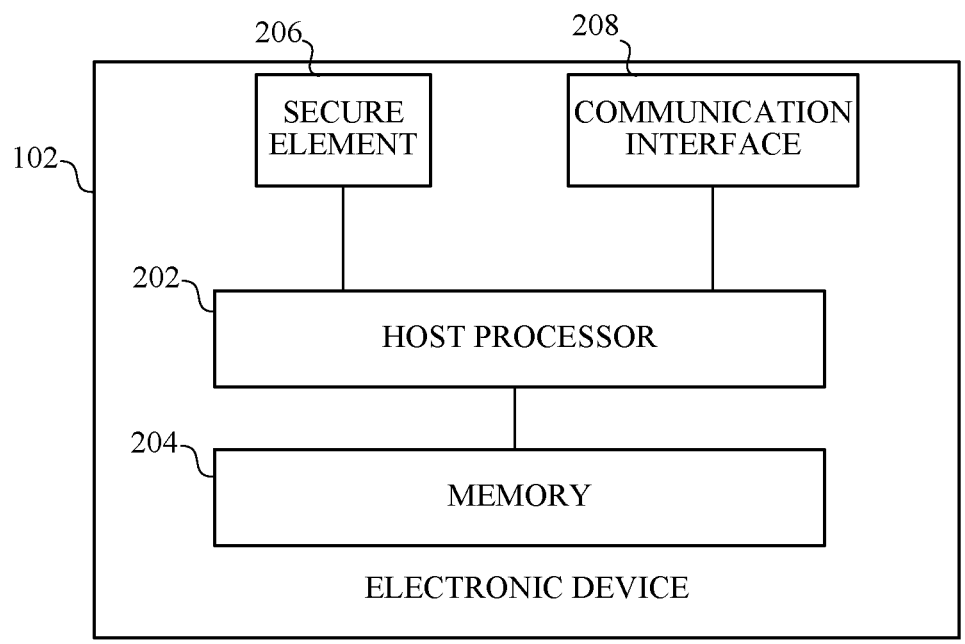
FIG. 2 depicts an example electronic device that may implement the subject methods and systems, in accordance with one or more implementations.

FIG. 2 depicts an example electronic device 102 that may implement the subject methods and systems, in accordance with one or more implementations. For explanatory purposes, FIG. 2 is primarily described herein with reference to the electronic device 102 of FIG. 1. However, this is merely illustrative, and features of the electronic device of FIG. 2 may be implemented in any other electronic device for implementing the subject technology. Not all of the depicted components may be used in all implementations, however, and one or more implementations may include additional or different components than those shown in FIG. 2. Variations in the arrangement and type of the components may be made without departing from the spirit or scope of the claims as set forth herein. Additional components, different components, or fewer components may be provided.

The electronic device 102 may include one or more of a host processor 202, a memory 204, a secure element 206, and/or a communication interface 208. The host processor 202 may include suitable logic, circuitry, and/or code that enable processing data and/or controlling operations of the electronic device 102. In this regard, the host processor 202 may be enabled to provide control signals to various other components of the electronic device 102. The host processor 202 may also control transfers of data between various portions of the electronic device 102. The host processor 202 may further implement an operating system or may otherwise execute code to manage operations of the electronic device 102.

The memory 204 may include suitable logic, circuitry, and/or code that enable storage of various types of information such as received data, generated data, code, and/or configuration information. The memory 204 may include volatile memory (e.g., random access memory (RAM)) and/or non-volatile memory (e.g., read-only memory (ROM), flash, and/or magnetic storage). In one or more implementations, the memory 204 may store user location data, track data (e.g., lane information), exercise data (e.g., biometrics), account data, and any other data generated in the course of performing the processes described herein.

The secure element 206 may include hardware that provides secure storage and management of sensitive information. The secure element 206 may be securely isolated from the host processor 202 and operating system, making it more difficult for unauthorized access. The secure element 206 may be used for secure transactions and identification, such as in payment credentials, digital passes, and the like. The secure element 206 may store sensitive information, such as cryptographic keys, and may protect the sensitive information with cryptographic algorithms and access controls. For example, the secure element 206 may include a hardware specific private key that is provisioned on the secure element 206 at or near the time of manufacture. The use of the secure element 206 provides an additional layer of security for sensitive information and helps to ensure its confidentiality in case the electronic device 102 is lost or compromised.

The communication interface 208 may include suitable logic, circuitry, and/or code that enables wired or wireless communication, such as between the electronic device 102 and the issuer server 110. The communication interface 208 may include, for example, one or more of a Bluetooth communication interface, an NFC interface, a Zigbee communication interface, a WLAN communication interface, a universal serial bus (USB) communication interface, a cellular interface, or generally any communication interface.

In one or more implementations, one or more of the host processor 202, the memory 204, the secure element 206, the communication interface 208, and/or one or more portions thereof may be implemented in software (e.g., subroutines and code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

Figure 3:
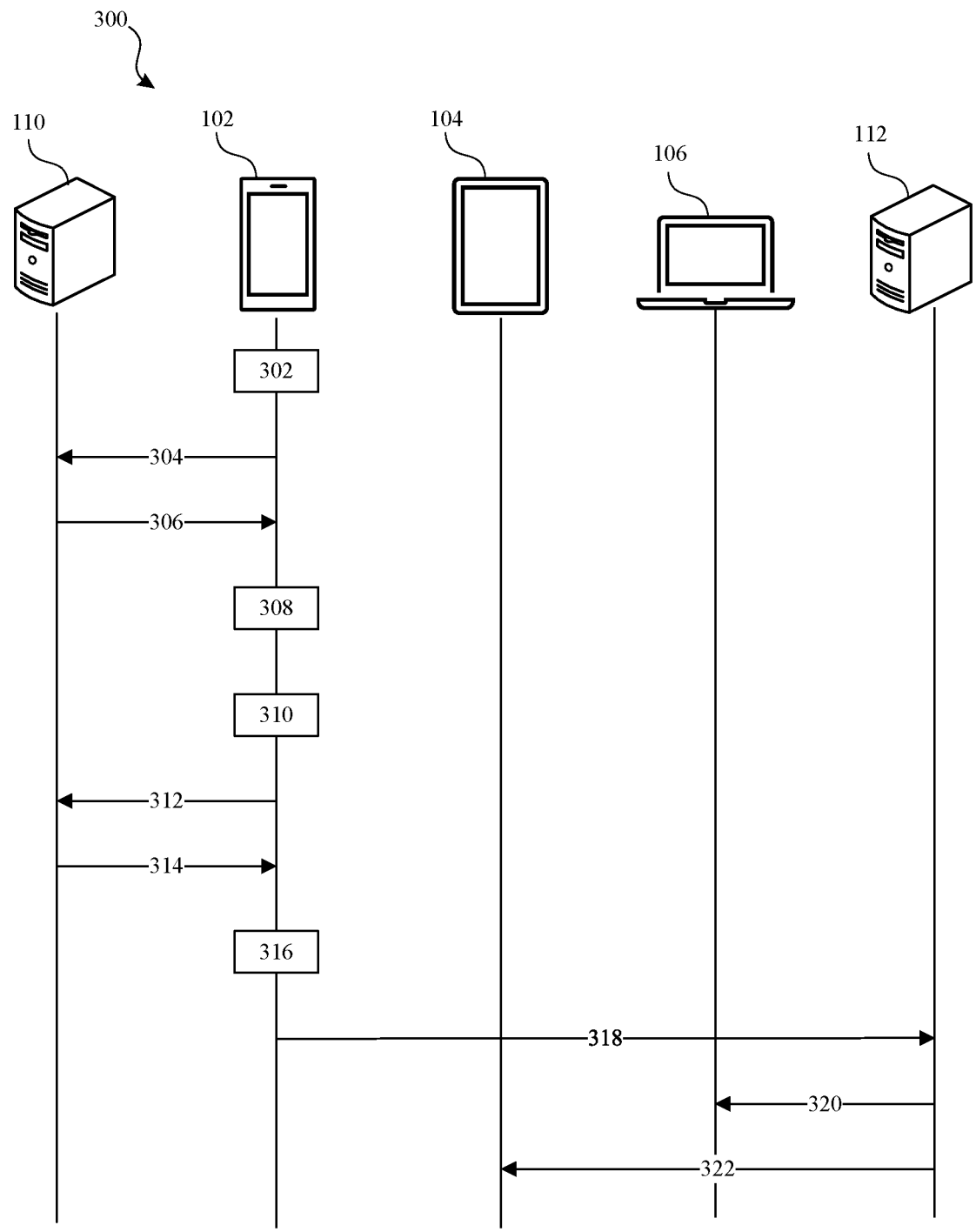
FIG. 3 depicts a timing diagram in which a digital pass is issued and secured, in accordance with one or more implementations.

FIG. 3 depicts a timing diagram 300 in which a digital pass is issued and secured, in accordance with one or more implementations. For explanatory purposes, the timing diagram 300 is primarily described herein with reference to the electronic device 102, the electronic device 104, the electronic device 106, the issuer server 110, and the account server 112 of FIG. 1. However, the timing diagram 300 is not limited to the electronic device 102, the electronic device 104, the electronic device 106, the issuer server 110, or the account server 112, and one or more periods of the timing diagram 300 may be performed by one or more other components of the issuer server 110, and/or by other suitable devices. Further, for explanatory purposes, the periods of the timing diagram 300 are described herein as occurring sequentially or linearly. However, multiple periods of the timing diagram 300 may occur in parallel. In addition, the periods of the timing diagram 300 need not be performed in the order shown and/or one or more periods of the timing diagram 300 need not be performed and/or can be replaced by other operations.

The electronic device 102 may have a digital wallet that may provide a user with access to various digital credentials on the electronic device 102, such as payment credentials, digital passes, digital keys, and the like. A digital pass may be requested and/or received from sources such as a mobile application, website, a physical terminal, and the like. Once received, the digital pass may be stored on the digital wallet and validated as belonging to the user account associated with the electronic device 102.

At period 302, the user may purchase and/or request a digital pass. For example, the user may order a ticket to an event via a software application of a ticket issuer and/or at a physical terminal and/or ticket window corresponding to a ticket issuer. Upon completion of the purchase, the issuer server 110 may transmit an order confirmation to the user. The order confirmation may include a digital pass or an option (e.g., a UI element) to receive the ticket in the form of a digital pass, which serves as a representation of the ticket purchased by the user, and/or obtained by the user.

At period 304, to obtain the digital pass, the electronic device 102 may send a request for the digital pass to the issuer server 110. The request for the digital pass may be triggered by the user interacting with a user interface element, such as a button or link, which may be included in the order confirmation received from the ticket issuer. In some implementations, the act of purchasing the ticket may also serve as a request for the digital pass.

To facilitate the request, the electronic device 102 may include a unique identifier associated with the user and/or the electronic device 102 in the request. This identifier may take the form of a username, key hash (e.g., hash of a public key), or any other unique identifier that is specific to the user and/or electronic device 102. The inclusion of this identifier allows the issuer server 110 to verify the identity of the requester and to determine the appropriate digital pass to provide in subsequent requests.

At period 306, the issuer server 110 may send, and the electronic device 102 may receive, issuer information. Issuer information may include callback uniform resource locators (URLs), identification profiles (e.g., a Fast IDentity Online (FIDO) profile), and any other information related to the issuer. The issuer server 110 may also send security information such as timestamps, session identifiers, digital signatures, or any other information included for security purposes.

For example, the electronic device 102 may use a timestamp to calculate the time difference between period 302 and the present time. If the time difference exceeds a predetermined threshold amount (e.g., a timeout period), the electronic device 102 may determine that the request has timed out and terminate the request, which may help to prevent unauthorized access and protect digital passes from potential security threats.

At period 308, the electronic device 102 may generate a key for use with the issuer server 110. The key may be generated as part of a public-private keypair, such as with a key generation algorithm such as Elliptic Curve Digital Signature Algorithm (ECDSA) or Rivest-Shamir-Adleman Algorithm (RSA). The public key, or representation of the public key (e.g., a public key hash) may be sent to the issuer server 110, while the private key may be stored on the electronic device 102 (e.g., in the secure element 206).

In some implementations, the electronic device 102 may authenticate the identity of the user before generating the public key. The electronic device 102 may prompt the user to provide an authentication input. For example, the electronic device 102 may present an instruction to the user to provide authentication data (e.g., biometric information) to the electronic device 102. The electronic device 102 may then determine whether the authentication input is valid by comparing the authentication input with previously obtained authentication data (e.g., stored on the device) and determining whether they match (e.g., match beyond a threshold degree of confidence). For example, the electronic device 102 may receive a representation (e.g., an image) of a fingerprint of the user and compare the representation with another, previously obtained representation of an authorized fingerprint, and/or hash or derivation thereof, to determine whether the received representation is valid.

At period 310, the electronic device 102 may generate security data. The security data includes data that may be embedded in a digital pass for linking the digital pass to the electronic device 102 and/or a user account associated with the electronic device 102. The security data may include, for example, a unique identifier. The unique identifier may be a set of one or more characters generated using an algorithm (e.g., random-based, time-based, or name-based Universal Unique Identifiers (UUIDs)) that ensures a high degree of certainty that the identifier will be unique across electronic devices and servers over time.

The security data may also include a signed version of the unique identifier. The unique identifier may be signed by a digital signature algorithm, such as RSA.

At period 312, the electronic device 102 may send the security data to the issuer server 110. The electronic device 102 may also send the public key or a representation of the public key (e.g., a key hash) to the issuer server 110.

The pass issuer server 110 may receive the security data and insert it into a digital pass to link the digital pass to the electronic device 102. The issuer server 110 may store the security data along with an identifier of the electronic device 102 (e.g., the public key or representation of the public key) to access the security data for subsequent requests from the electronic device 102. For example, the electronic device 102 may request another digital pass from the issuer server 110 and identify itself via the public key or representation of the public key. The issuer server 110 may then retrieve the security data associated with the public key or representation of the public key and generate a new pass that includes the retrieved security data. When the issuer server 110 receives the security data, the issuer server 110 may insert it into a digital pass to link the digital pass to the electronic device 102. Because the electronic device 102 has the private key, the electronic device 102 can confidently verify that it owns the digital pass. Additionally, to prevent data from being improperly inserted or removed from the digital pass by others, the issuer server 110 may sign the digital pass based on a digital certificate from a certificate authority trusted by the issuer server 110 and the electronic device 102.

At period 314, the issuer server 110 may send, and the electronic device 102 may receive, the digital pass.

At period 316, the electronic device 102 may determine whether the digital pass is valid. If the digital pass is signed based on a digital certificate from the trusted certificate authority, the electronic device 102 may utilize the digital certificate to verify the digital signature of the digital pass.

To determine whether the digital pass is valid for the electronic device 102, the electronic device 102 may extract and examine the security data from the digital pass. The electronic device 102 may access the signed unique identifier from the security data and determine whether its digital signature is valid by using a signature verifying algorithm, such as RSA, with the public key of the electronic device 102.

If the digital pass is valid, the electronic device 102 may be able to use the digital pass. For example, the electronic device 102 may present a barcode of the digital pass or transmit an NFC signal based on the digital pass. If the digital pass is invalid, the electronic device 102 may disable the digital pass so that the digital pass cannot be used. For example, the electronic device 102 may remove data from the digital pass and/or modify the data of the digital pass to prevent any device from utilizing the digital pass.

At period 318, the electronic device 102 may provide the digital pass to one or more other electronic devices (e.g., the electronic device 104 and the electronic device 106) associated with the same user account as the electronic device 102.

In some implementations, the electronic device 102 may provide the digital pass to one or more other electronic devices associated with the same user account. The electronic device 102 may send the digital pass to an account server 112, which subsequently forwards the digital pass to the one or more electronic devices associated with the same user account. For example, in period 318, the electronic device 102 may send the digital pass to the account server 112. The account server 112 may then synchronize the digital pass with electronic device 106 at period 320 and electronic device 104 at period 322.

In some implementations, the electronic device 102 may provide the digital pass to one or more other electronic devices associated with the same user account by sending the pass directly to the one or more other electronic devices. For example, the electronic device 102 may send the digital pass to the electronic device 104 via a wireless communication protocol, such as Bluetooth, Wi-Fi or generally any communication protocol that may be used to synchronize data between devices.

In some implementations, the electronic device 102 may provide the keys generated at period 308 to one or more other electronic devices associated with the same user account. For example, the distribution of the keypair enables another electronic device of the user to generate security data and validate its authenticity.

Figure 4:
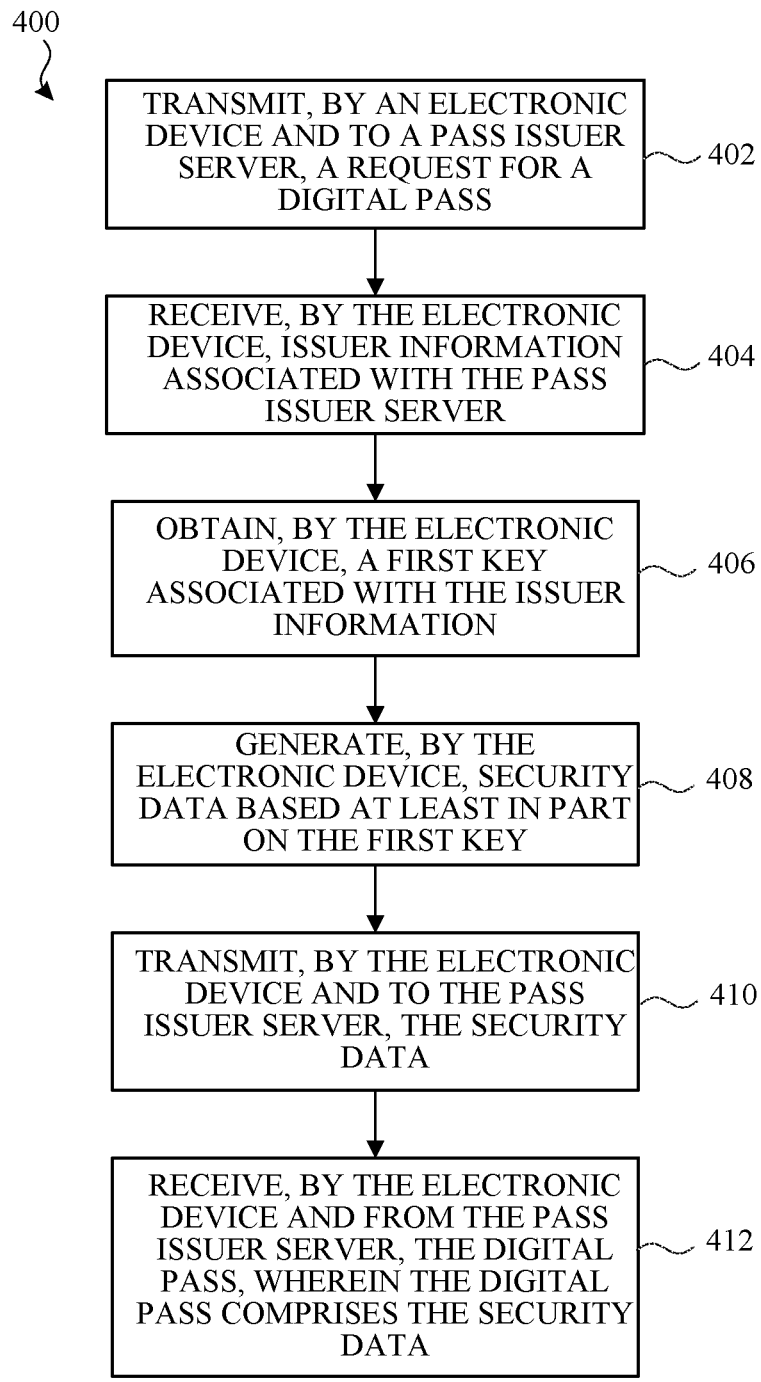
FIG. 4 depicts a flow diagram of an example process for securing a digital pass, in accordance with one or more implementations.

FIG. 4 depicts a flow diagram of an example process 400 for securing a digital pass, in accordance with one or more implementations. For explanatory purposes, the process 400 is primarily described herein with reference to the electronic device 102, the electronic device 104, the electronic device 106, the issuer server 110, and the account server 112 of FIG. 1. However, the process 400 is not limited to the electronic device 102, the electronic device 104, the electronic device 106, the issuer server 110, or the account server 112, and one or more blocks of the process 400 may be performed by one or more other components of the issuer server 110, and/or by other suitable devices. Further, for explanatory purposes, the blocks of the process 400 are described herein as occurring sequentially or linearly. However, multiple blocks of the process 400 may occur in parallel. In addition, the blocks of the process 400 need not be performed in the order shown and/or one or more blocks of the process 400 need not be performed and/or can be replaced by other operations.

At block 402, the electronic device 102 may transmit a request for a digital pass to an issuer server 110. The request may be an initial request by the electronic device 102 to the issuer server 110 or a subsequent request.

In a subsequent request, the electronic device 102 may provide to the issuer server 110 an identifier of the electronic device 102. For example, the electronic device 102 may include a public key or a representation of the public key (e.g., a key hash) that it previously created for the issuer server 110 and that is used to represent an account of the user. Based on the identifier, the issuer server 110 may check if security data exists for the user. If security data exists for the user, the process 400 may skip to block 412 where the issuer server 110 sends to the electronic device 102 a digital pass including the security data.

At block 404, the electronic device 102 may receive issuer information associated with the issuer server 110. The issuer information may include information about the issuer server 110 such as callback URLs, identification profiles, and any other relevant information. The issuer server 110 may also send security information including timestamps, session identifiers, digital signatures, or any other security-related information to ensure the secure transmission of the data.

At block 406, the electronic device 102 may obtain a first key (e.g., a private key) associated with the issuer information. In an initial pass request, the electronic device 102 may generate a key to be used with the issuer server 110. The key may be generated using a key generation algorithm, such as ECDSA or RSA, and may include a public and a private key. The public key, or a representation of the public key (e.g., a public key hash), may be sent to the issuer server 110, while the original keypair (or portions and/or representations thereof) is stored securely on the electronic device 102 (e.g., in a secure element 206). The private key, and/or information from which the private key may be derived, can be synchronized with the user's other devices (e.g., devices associated with the same user account). In a subsequent pass request, the electronic device 102 may access one or more of the keys from local storage (e.g., memory 204).

At block 408, the electronic device 102 may generate security data based at least in part on the first key (e.g., the private key). The security data may be used to link the digital pass to the electronic device 102 and/or a user account associated with the electronic device 102. The security data may include a unique identifier generated using algorithms to ensure its uniqueness (e.g., a UUID algorithm) and a signed version of the unique identifier.

At block 410, the electronic device 102 may transmit the security data to the issuer server 110. The issuer server 110 receives the security data and links it to the electronic device 102 by storing the security data along with an identifier of the electronic device 102, such as the public key or a representation of the public key (e.g., a key hash), to be able to access the security data later for subsequent requests.

At block 412, the electronic device 102 may receive the digital pass from the issuer server 110. The digital pass includes the security data, and the electronic device 102 may determine if the digital pass is valid by extracting and examining the security data from the digital pass. The electronic device 102 may check the signed unique identifier's digital signature by using a signature verification algorithm that corresponds with the digital signature algorithm from block 406. If the digital pass is invalid, the electronic device 102 may disable the digital pass so it cannot be used. In some implementations, the electronic device 102 may provide the digital pass and/or one or more keys to other electronic devices associated with the same user account (e.g., the electronic device 104 and the electronic device 106).

Figure 5:
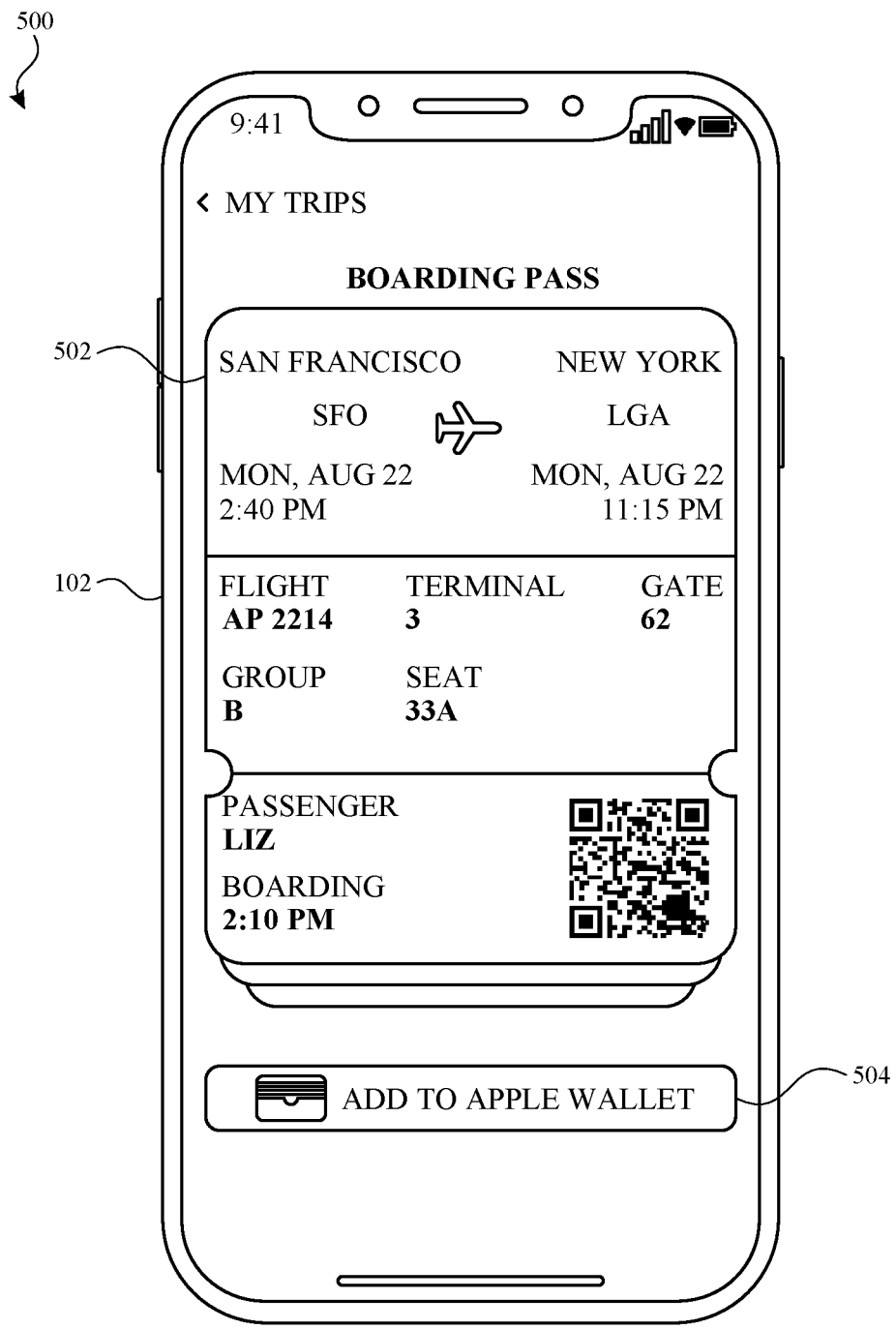
FIG. 5 depicts an example digital pass on a mobile application, in accordance with one or more implementations.

FIG. 5 depicts an example digital pass 502 on a mobile application 500, in accordance with one or more implementations. The mobile application 500, for example, may distribute boarding passes for an airline. The user may book a trip and receive an option 504 on the electronic device 102 via the mobile application 500 to receive the boarding pass as a digital pass. The option 504 may be presented to the user as a UI element in the mobile application 500 that, when pressed, initiates a request for a digital pass from an issuer server 110. If the digital pass is valid (e.g., the user's electronic device 102 can verify the security data on the digital pass), the electronic device 102 may add the digital pass to the digital wallet of the electronic device 102.

Figure 6:
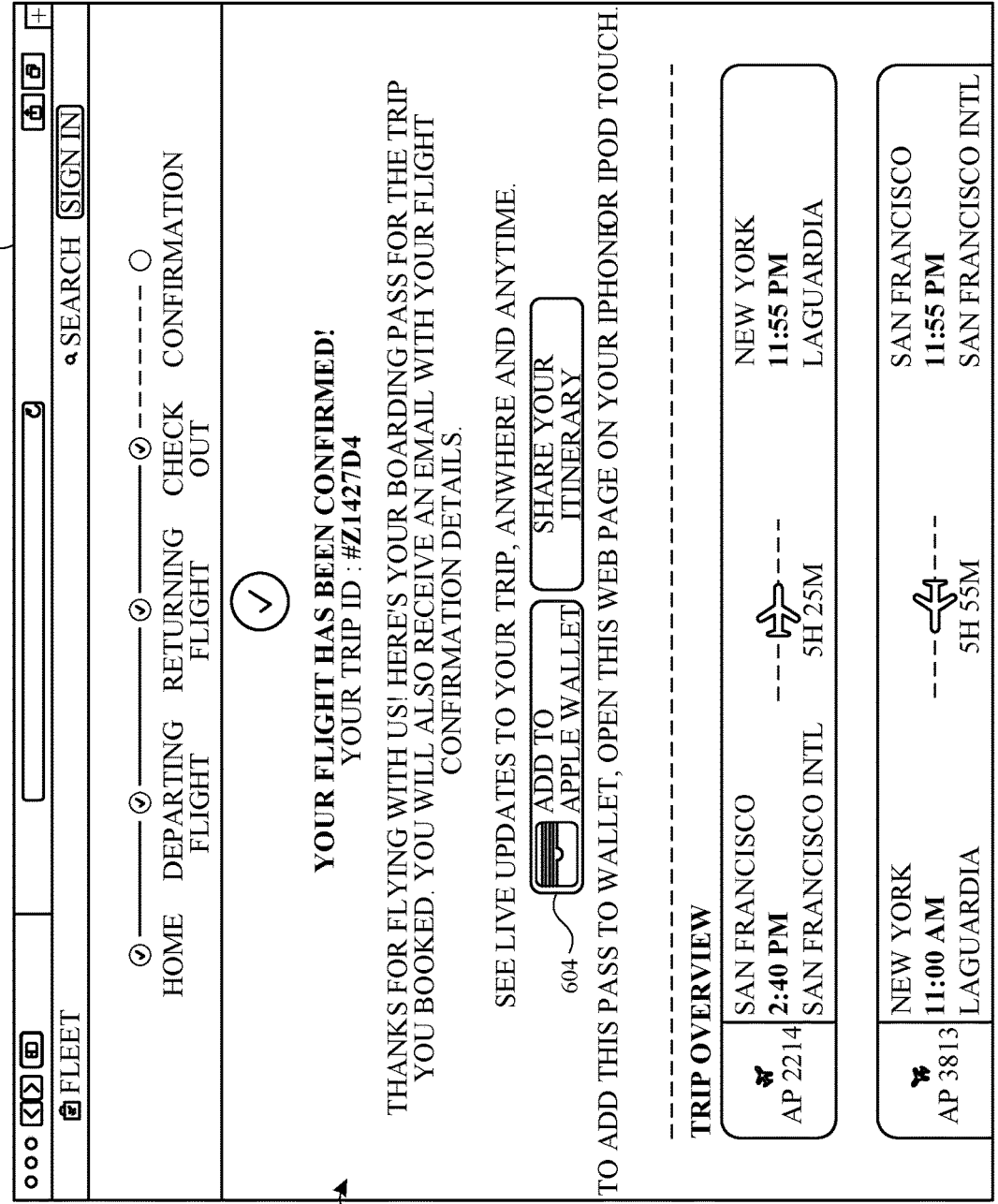
FIG. 6 depicts an example digital pass on a web browser, in accordance with or more implementations.

FIG. 6 depicts an example digital pass 602 on a web browser 600, in accordance with or more implementations. The web browser 600, for example, may distribute boarding passes for an airline. The user may book a trip and receive an order confirmation including an option 604 on the electronic device 102 via the web browser 600 to receive the boarding pass as a digital pass. The option 604 may be presented to the user as a UI element in the web browser 600 that, when pressed, requests and receives a digital pass from an issuer server 110. If the digital pass is valid (e.g., the user's electronic device 102 can verify the security data on the digital pass), the electronic device 102 may add the digital pass to the digital wallet of the electronic device 102.

Figure 7:
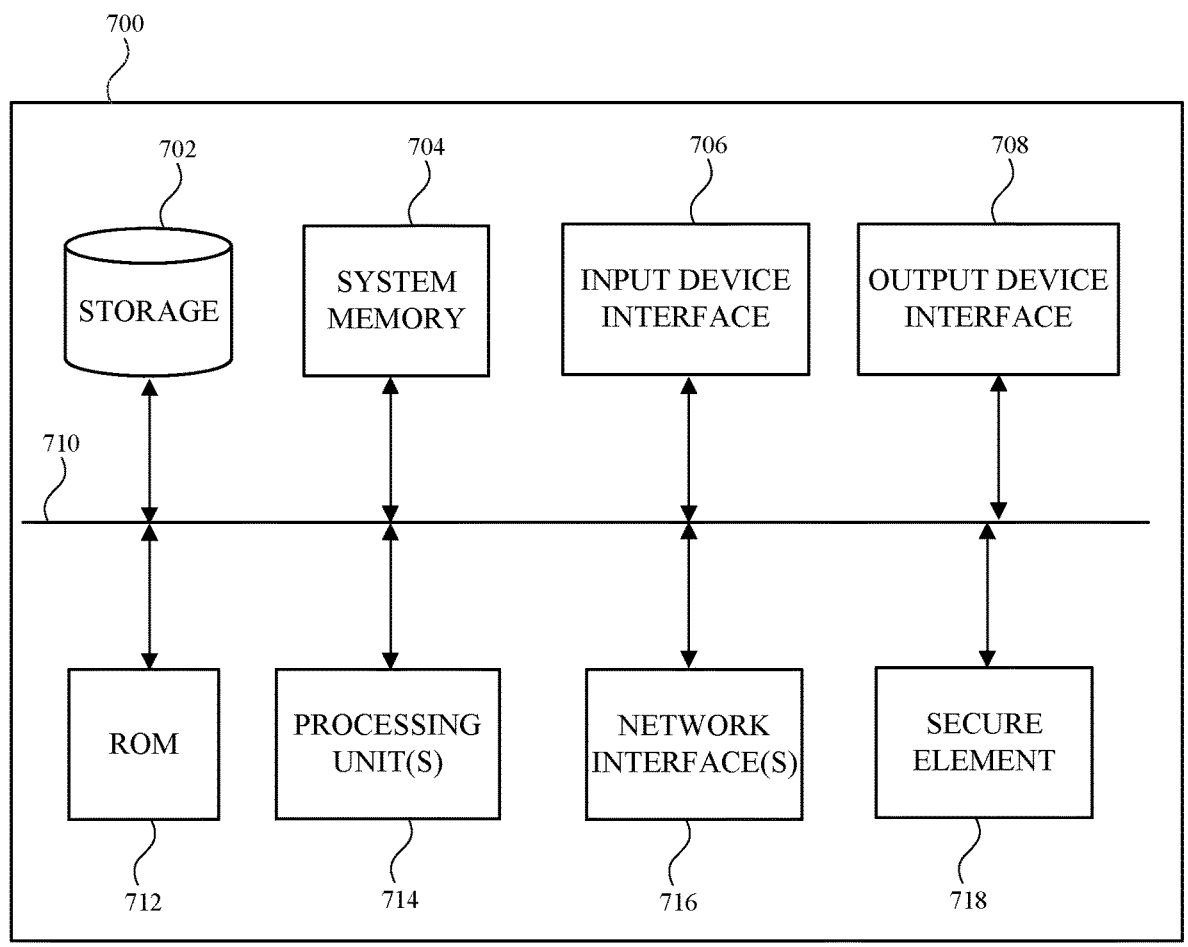
FIG. 7 depicts an example electronic system with which aspects of the present disclosure may be implemented, in accordance with one or more implementations.

FIG. 7 depicts an example electronic system 700 with which aspects of the present disclosure may be implemented, in accordance with one or more implementations. The electronic system 700 can be, and/or can be a part of, any electronic device for generating the features and processes described in reference to FIGS. 1-6, including but not limited to a laptop computer, tablet computer, smartphone, and wearable device (e.g., smartwatch, fitness band). The electronic system 700 may include various types of computer-readable media and interfaces for various other types of computer-readable media. The electronic system 700 includes one or more processing unit(s) 714, a persistent storage device 702, a system memory 704 (and/or buffer), an input device interface 706, an output device interface 708, a bus 710, a ROM 712, one or more processing unit(s) 714, one or more network interface(s) 716, a secure element 718, and/or subsets and variations thereof.

The bus 710 collectively represents all system, peripheral, and chipset buses that communicatively connect the numerous internal devices of the electronic system 700. In one or more implementations, the bus 710 communicatively connects the one or more processing unit(s) 714 with the ROM 712, the system memory 704, and the persistent storage device 702. From these various memory units, the one or more processing unit(s) 714 retrieves instructions to execute and data to process in order to execute the processes of the subject disclosure. The one or more processing unit(s) 714 can be a single processor or a multi-core processor in different implementations.

The ROM 712 stores static data and instructions that are needed by the one or more processing unit(s) 714 and other modules of the electronic system 700. The persistent storage device 702, on the other hand, may be a read-and-write memory device. The persistent storage device 702 may be a non-volatile memory unit that stores instructions and data even when the electronic system 700 is off. In one or more implementations, a mass-storage device (such as a magnetic or optical disk and its corresponding disk drive) may be used as the persistent storage device 702.

In one or more implementations, a removable storage device (such as a floppy disk, flash drive, and its corresponding disk drive) may be used as the persistent storage device 702. Like the persistent storage device 702, the system memory 704 may be a read-and-write memory device. However, unlike the persistent storage device 702, the system memory 704 may be a volatile read-and-write memory, such as RAM. The system memory 704 may store any of the instructions and data that one or more processing unit(s) 714 may need at runtime. In one or more implementations, the processes of the subject disclosure are stored in the system memory 704, the persistent storage device 702, and/or the ROM 712. From these various memory units, the one or more processing unit(s) 714 retrieves instructions to execute and data to process in order to execute the processes of one or more implementations.

The bus 710 also connects to the input device interfaces 706 and output device interfaces 708. The input device interface 706 enables a user to communicate information and select commands to the electronic system 700. Input devices that may be used with the input device interface 706 may include, for example, alphanumeric keyboards, touch screens, and pointing devices. The output device interface 708 may enable the electronic system 700 to communicate information to users. For example, the output device interface 708 may provide the display of images generated by electronic system 700. Output devices that may be used with the output device interface 708 may include, for example, printers and display devices, such as a liquid crystal display (LCD), a light emitting diode (LED) display, an organic light emitting diode (OLED) display, a flexible display, a flat panel display, a solid-state display, a projector, or any other device for outputting information.

One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

The bus 710 also connects to secure element 718. The secure element 718 may include hardware and/or software that provides secure storage and management of sensitive information. The secure element 718 may be isolated from the processing unit 714 and operating system, making it more difficult for unauthorized access. The secure element 718 may be used for secure transactions and identification, such as in payment cards and digital passes. The secure element 718 may store sensitive information, such as cryptographic keys, and may protect the sensitive information (e.g., with cryptographic algorithms and access controls).

Finally, as shown in FIG. 7, the bus 710 also couples the electronic system 700 to one or more networks and/or to one or more network nodes through the one or more network interface(s) 716. In this manner, the electronic system 700 can be a part of a network of computers (such as a local area network, a wide area network, an Intranet, or a network of networks, such as the Internet). Any or all components of the electronic system 700 can be used in conjunction with the subject disclosure.

Implementations within the scope of the present disclosure can be partially or entirely realized using a tangible computer-readable storage medium (or multiple tangible computer-readable storage media of one or more types) encoding one or more computer-readable instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, dynamic random access memory (DRAM), static random access memory (SRAM), thyristor RAM (T-RAM), zero capacitor RAM (Z-RAM), and twin transistor RAM (TTRAM). The computer-readable medium also can include any non-volatile semiconductor memory, such as ROM, programmable read-only memory (PROM), erasable programmable read-only memory (EPROM), electrically erasable programmable read-only memory (EEPROM), non-volatile random-access memory (NVRAM), flash, non-volatile SRAM (nvSRAM), ferroelectric RAM (FeRAM), ferroelectric transistor RAM (FeTRAM), magnetoresistive RAM (MRAM), parameter RAM (PRAM), conductive bridge RAM (CBRAM), silicon-oxide-nitride-oxide-silicon (SONOS), resistive RAM (RRAM), nano RAM (NRAM), racetrack memory, floating junction gate (FJG) RAM, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessors or multi-core processors that execute software, one or more implementations are performed by one or more integrated circuits, such as ASICs or FPGAs. In one or more implementations, such integrated circuits execute instructions that are stored on the circuit itself.

As described above, one aspect of the present technology is the gathering and use of data available from specific and legitimate sources for file sharing. The present disclosure contemplates that in some instances, this gathered data may include personal information data that uniquely identifies or can be used to identify a specific person. Such personal information data can include demographic data, location-based data, online identifiers, telephone numbers, email addresses, home addresses, images, videos, audio data, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, personal information data can be used for file sharing. Accordingly, the use of such personal information data may facilitate transactions (e.g., online transactions). Further, other uses for personal information data that benefit the user are also contemplated by the present disclosure. For instance, health and fitness data may be used, in accordance with the user's preferences to provide insights into their general wellness or may be used as positive feedback to individuals using technology to pursue wellness goals.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates implementations in which users selectively block the use of, or access to, personal information data. That is, the present disclosure contemplates that hardware and/or software elements can be provided to prevent or block access to such personal information data. For example, in the case of file sharing, the present technology can be configured to allow users to select to "opt-in" or "opt-out" of participation in the collection of personal information data during registration for services or anytime thereafter. In addition to providing "opt-in" and "opt-out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health-related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed implementations, the present disclosure also contemplates that the various implementations can also be implemented without the need for accessing such personal information data. That is, the various implementations of the present technology are not rendered inoperable due to the lack of all or a portion of such personal information data.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way), all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station," "receiver," "computer," "server," "processor," and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refers to only A, only B, or only C; any combination of A, B, and C; and/or at least one of each of A, B, and C.

The predicate words "configured to," "operable to," and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, one or more implementations, one or more implementations, an embodiment, the embodiment, another embodiment, one or more implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration." Any implementation described herein as "exemplary" or as an "example" is not necessarily to be construed as preferred or advantageous over other implementations. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method comprising:
   transmitting, by an electronic device and to a pass issuer server, a request for a digital pass;
   receiving, by the electronic device, issuer information associated with the pass issuer server;
   obtaining, by the electronic device, a first key associated with the issuer information;
   generating, by the electronic device, security data based at least in part on the first key;
   transmitting, by the electronic device and to the pass issuer server, the security data; and
   receiving, by the electronic device and from the pass issuer server, the digital pass, wherein the digital pass comprises the security data.

2. The method of claim 1, wherein obtaining the first key comprises:
   determining whether a local storage includes the issuer information;
   in response to determining that the local storage includes the issuer information, accessing the first key from the local storage based on the issuer information; and
   in response to determining that the local storage does not include the issuer information, generating the first key.

3. The method of claim 1, wherein generating the security data based at least in part on the first key comprises:
   generating a unique identifier; and
   signing the unique identifier using the first key, wherein the security data comprises the unique identifier and the signed unique identifier.

4. The method of claim 1, further comprising:
   providing, by the electronic device, the digital pass and the first key to one or more other electronic devices associated with a same user account as the electronic device.

5. The method of claim 1, wherein receiving, by the electronic device, the issuer information comprises:
   receiving, by the electronic device, the issuer information;
   determining, by the electronic device, whether the issuer information was received more than a threshold amount of time after transmission of the request for the digital pass; and
   outputting a timeout indication in response to a determination that the issuer information was received more than the threshold amount of time after transmission of the request for the digital pass.

6. The method of claim 1, wherein obtaining, by the electronic device, the first key associated with the issuer information comprises:
   obtaining, by the electronic device, a second key associated with the issuer information, wherein the first key is a private key and the second key is a public key corresponding to the first key.

7. The method of claim 6, wherein receiving, by the electronic device and from the pass issuer server, the digital pass comprises:
   determining, by the electronic device, whether the digital pass is valid based on the security data and the second key; and
   disabling the digital pass in response to a determination that the digital pass is not valid.

8. The method of claim 7, wherein determining, by the electronic device, whether the digital pass is valid comprises:
   accessing the security data from the digital pass;
   accessing a unique identifier and a signed unique identifier from the security data; and
   verifying, based at least in part on the second key, that the unique identifier is a same identifier as the signed unique identifier.

9. The method of claim 6, further comprising:
   transmitting, by the electronic device and to the pass issuer server, a request for another digital pass;
   receiving, by the electronic device and from the pass issuer server, the other digital pass, wherein the other digital pass comprises the security data; and
   determining whether the other digital pass is valid based on the security data and the second key.

10. The method of claim 1, wherein obtaining, by the electronic device, the first key comprises:
    presenting, by the electronic device, an authentication prompt;
    receiving, by the electronic device, an authentication input in response to the authentication prompt;
    determining, by the electronic device, whether the authentication input is valid based on a local authentication data; and
    obtaining, by the electronic device, the first key in response to a determination that the authentication input is valid.

11. The method of claim 1, further comprising:
    displaying a representation of the received digital pass in a digital wallet.

12. An electronic device comprising:
    a memory; and
    a processor circuit configured to:
      transmit, to a pass issuer server, a request for a digital pass;
      receive issuer information associated with the pass issuer server;
      obtain a first key associated with the issuer information;
      generate security data based at least in part on the first key;
      transmit, to the pass issuer server, the security data; and
      receive, from the pass issuer server, the digital pass, wherein the digital pass comprises the security data.

13. The electronic device of claim 12, wherein obtaining the first key comprises:
    determining whether a local storage includes the issuer information;
    in response to determining that the local storage includes the issuer information, accessing the first key from the local storage based on the issuer information; and in response to determining that the local storage does not include the issuer information, generating the first key.

14. The electronic device of claim 12, wherein generating the security data based at least in part on the first key comprises:
   generating a unique identifier; and
   signing the unique identifier using the first key, wherein the security data comprises the unique identifier and the signed unique identifier.

15. The electronic device of claim 12, wherein the processor circuit is further configured to:
   providing, by the electronic device, the digital pass and the first key to one or more other electronic devices associated with a same user account as the electronic device.

16. The electronic device of claim 12, wherein receiving the issuer information comprises:
   receiving, by the electronic device, the issuer information;
   determining, by the electronic device, whether the issuer information was received more than a threshold amount of time after transmission of the request for the digital pass; and
   outputting a timeout indication in response to a determination that the issuer information was received more than the threshold amount of time after transmission of the request for the digital pass.

17. The electronic device of claim 12, wherein obtaining the first key associated with the issuer information comprises:
   obtaining, by the electronic device, a second key associated with the issuer information, wherein the first key is a private key and the second key is a public key corresponding to the first key.

18. The electronic device of claim 17, wherein receiving, from the pass issuer server, the digital pass comprises:
   determining, by the electronic device, whether the digital pass is valid based on the security data and the second key; and
   disabling the digital pass in response to a determination that the digital pass is not valid.

19. The electronic device of claim 18, wherein determining whether the digital pass is valid comprises:
   accessing the security data from the digital pass;
   accessing a unique identifier and a signed unique identifier from the security data; and
   verifying, based at least in part on the second key, that the unique identifier is a same identifier as the signed unique identifier.

20. A non-transitory computer-readable medium comprising:
   computer-readable instructions that, when executed by a processor, cause the processor to perform one or more operations comprising:
      transmit, by an electronic device and to a pass issuer server, a request for a digital pass;
      receive, by the electronic device, issuer information associated with the pass issuer server;
      obtain, by the electronic device, a first key associated with the issuer information;
      generate, by the electronic device, security data based at least in part on the first key;
      transmit, by the electronic device and to the pass issuer server, the security data;
      receive, by the electronic device and from the pass issuer server, the digital pass, wherein the digital pass comprises the security data; and
      displaying a representation of the received digital pass in a digital wallet.

\* \* \* \* \*